Patented Apr. 10, 1934

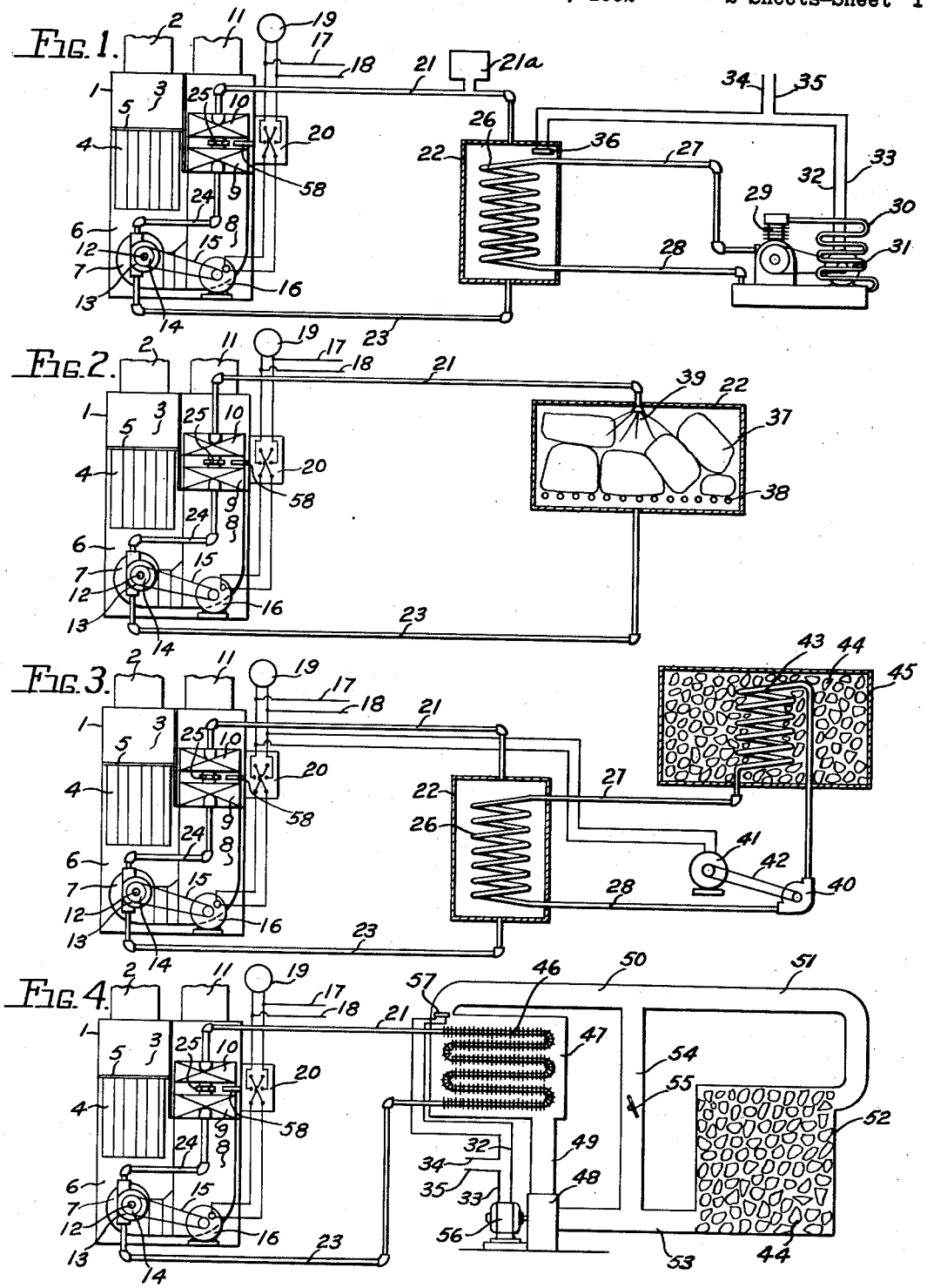

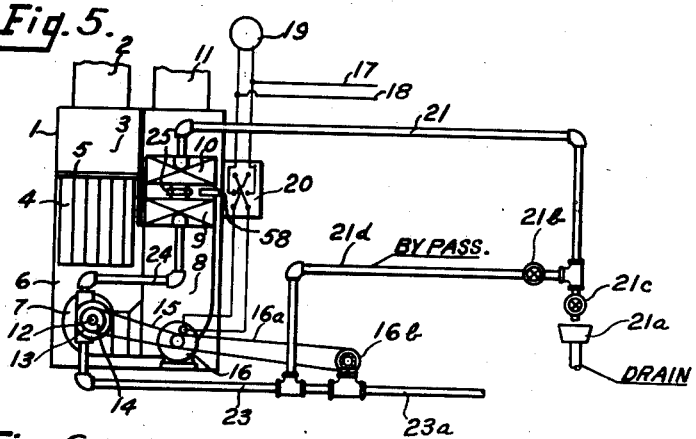
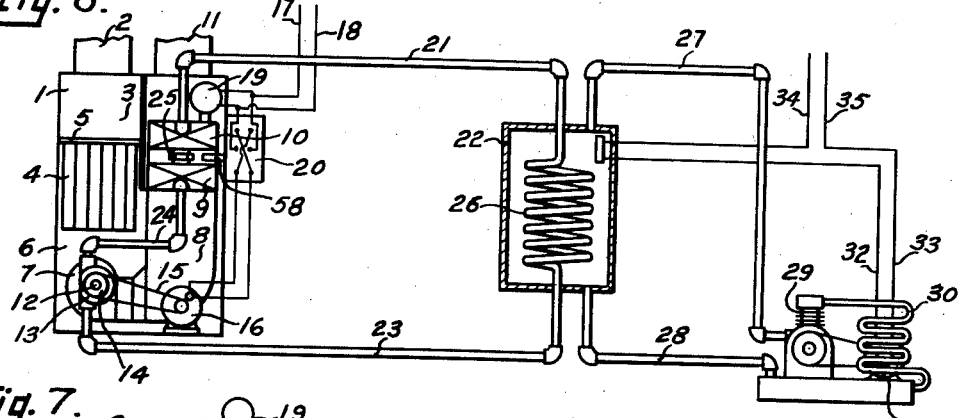
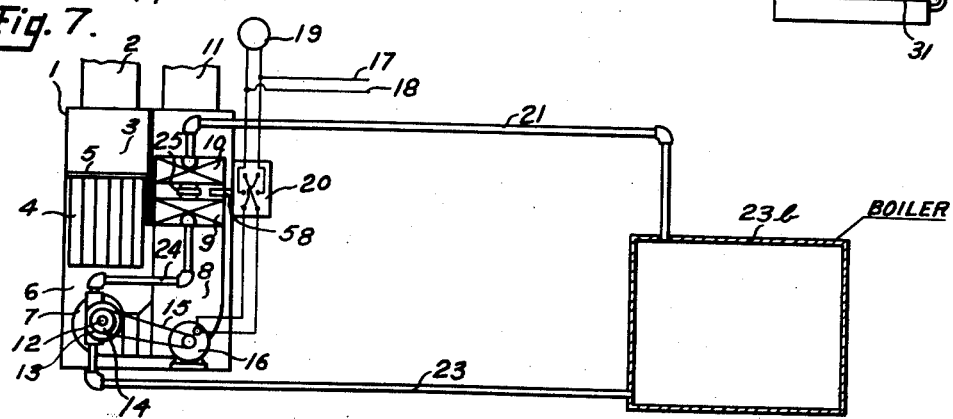

1,954,455

UNITED STATES PATENT OFFICE 1,954,455

AIR CONDITIONING APPARATUS

Clark T. Morse and Edward L. Hogan, Detroit, Mich., assignors to American Blower Corporation, Detroit, Mich., a corporation of Delaware Application January 11, 1932, Serial No. 585,986

8 Claims. (Cl. 257—9)

Our invention relates to air conditioning apparatus and a method of air conditioning.

It is the object of our invention to provide an air conditioning apparatus, for instance, for heating or cooling, the heating and cooling unit being in a closed circuit, the contents of which circuit is regulated by a source of cold or heat, preferably remote from the circuit, but having a portion of its system in contact with the contents of the circuit first mentioned.

It is a further object to provide means to circulate the fluid in the air conditioning circuit to bring it in contact with the heating and cooling unit interposed in the circuit.

It is a further object to provide means and method of controlling the temperature of the air delivered from the air conditioning mechanism by controlling the heating or cooling unit and its application of heat or cold to the fluid in the air conditioning circuit mechanism. By the maintenance of a definite temperature in the circulation of the air conditioning system, accurate control of the temperature of the air passing therethrough can be secured. Furthermore, by thermostatically controlling the opening and closing of a motor driving the blower, which likewise drives the pump that circulates the liquid in the air conditioning machine circuit, the heated or cooled liquid is conveyed to and from the source of heat or cooling of it only when the thermostat brings the air conditioning mechanism into operation, thereby materially reducing the cost of operating the system.

Referring to the drawings, Figure 1 is a diagrammatic view of an air conditioning mechanism having a common motor for operating a pump and a blower for moving the air through the air conditioning mechanism to and from an enclosure, the motor being controlled by a thermostat located in its circuit, the thermostat being located in the room to which the conditioned air is delivered or from which it is withdrawn. And in Figure 1 there is particularly shown the interposition of the cooling coil having relatively low temperature, over which coil the liquid in the closed circuit of the air conditioning mechanism is circulated by the pump.

Figure 2 is a similar view in which the liquid in the circuit is circulated over blocks of ice.

Figure 3 is a similar view in which the source of the low temperature refrigerant is derived from circulating the refrigerant through a coil surrounded by solid carbon dioxide and another coil in that circuit interposed in the liquid of the air conditioning machine circuit for maintaining it at a predetermined temperature.

Figure 4 is a similar view showing in the air conditioning circuit a heat transfer coil over which air is driven by a blower in a closed gas circuit system in which is a quantity of solid carbon dioxide, through which the gas can be circulated and around which the gas can be by-passed.

Figure 5 is a diagrammatic view of the system using water as a refrigerant medium.

Figure 6 is a similar view showing the use of the thermostat in the radiator for controlling the circulation of the fluid through the radiator circulatory system.

Figure 7 is a diagrammatic view showing the employment of a heating boiler in the radiator circulatory system.

Referring to the drawings in detail, 1 is a casing having a return air or air inlet pipe 2 which empties into a compartment 3 from which the air discharges through the depending filter stockings 4, of which there are a plurality depending from the partition 5. The air thus filtered is introduced into the compartment 6 and thence enters the blower 7, from whence it is discharged through the passageway 8 over the heat transfer mechanism such as the radiators 9 and 10. It thence passes out of the air outlet pipe 11 after having been suitably heated or cooled depending upon whether the system is being operated in winter or summer.

The blower 7 is operated from the shaft 12 which is also connected to the pump 13. This shaft is driven through the pulley 14 by a belt 15 and motor 16. The motor is supplied through the wires 17 and 18 with current from any desired source. In the motor circuit is located a room thermostat 19 which serves to open and close the motor circuit including the wires 17 and 18 and motor 16. A reversing relay 20 is provided so that the direction of the thermostat 19 can be reversed in order to reverse the direction of the moving parts driven thereby according to winter or summer operation.

Connected to the radiators 9 and 10, which are interconnected to one another, are the circuit pipes, comprising a pipe 21 which is connected to the chamber 22, the pipe 23 which is connected from the chamber 22 to the pump 13 and from the pump 13, the line passes at 24 to the radiator 9. The radiators are interconnected by the pipe 25. 21a is an expansion tank.

In the chamber 22 through which the fluid in the air conditioning mechanism circuit flows is a heat transfer coil 26 connected to the pipe 27 and 28 to a refrigerating machine having a compressor 29 and coil 30. This compressor is operated by the electric motor 31 having the circuit wires 32 and 33 connected to a suitable source of current by the wires 34 and 35. In this motor circuit for the refrigerating machine is a thermostat 36 for opening and closing the circuit, which thermostat is located in the chamber 22 and is affected by the temperature of the liquid being pumped therethrough.

In Figure 2 there is a modification showing the chamber 22 comprising an ice box for ice 37 resting on the grille work 38 over which the fluid in the closed circuit is supplied as at 39.

In Figure 3 there is a modification of Figure 1 in that the refrigerant circuit comprising the coil 26 and pipes 27 and 28 includes a circulating pump 40 driven by a motor 41 and a belt 42. In this refrigerant circuit is a second coil 43 located in a body of solid carbon dioxide 44 in the casing 45.

A further modification of our invention is shown in Figure 4 where we employ a heat transfer coil 46 which is located in a closed air circuit system comprising a container 47 over which air is driven by the blower 48 through the pipe 49 and thence to the pipe 50, 51 through the box 52 containing the solid carbon dioxide 44 to the pipe 53, back to the blower, but in the event it is desired to by-pass the air to one side of the solid carbon dioxide, then the air can be passed through the by-pass shunt pipe 54 which is controlled by the damper 55, which may or may not be thermostatically operated. If desired, the motor 56 driving the blower 48 can be controlled by having its circuit opened and closed through the thermostat 57 operating within the casing 47.

It will be noted that our method comprehends the circulation of air to and from an enclosure or from a source of fresh air to an enclosure, which air is preferably filtered and then driven by a blower over heat transfer radiators after having been suitably cooled or heated and delivered into an enclosure.

If desired, it may be humidified by a water spray injected through the pipe 58.

The radiators 9 and 10 have the air blown over them by the closing of the thermostat 19 and the subsequent closing of the motor circuit of the motor 16 at the same time the liquid in the circuit is circulated, and only when the mechanism is operating and the air is moving over the radiators does the liquid so circulate, except for its inherent gravity circulation.

Consequently, with the refrigerant in the refrigerant circuit maintaining a constant temperature as through the agency of the thermostat 36 or 57, which only operates when it is necessary to maintain a predetermined temperature in the area of contact between the refrigerant coil and the liquid in the radiator circuit of the air conditioning system, it is possible to reduce the amount of refrigeration or heat required to the minimum, to only operate the mechanism and to apply such heat or cooling methods when the air is being delivered to the room and for controlling such application of the temperature of the room by a thermostat in the room.

While the thermostatic control is not an essential to the invention, but a very important part of it, it is possible to operate without it by manual means or other forms of thermostatic control.

Likewise it will be understood that in the place of the refrigerating machine shown in Figure 1 or other means of changing the temperature of the air, a source of heat may be employed when it is desired to heat the air as in winter time.

Our method comprehends the maintenance of a definite temperature at a point in the circuit for the liquid which passes through the radiators of the air conditioning machine and of operating the air moving means over those radiators and of operating the liquid moving means through the radiators simultaneously so that when the air is moving and its temperature is to be modified, the liquid is moving which is to modify that temperature.

It will be understood that we desire to comprehend within our invention such modifications as may be necessary to adapt it to varying conditions and uses. By liquid we mean any heat transfer medium and by medium we mean any liquid or gas adaptable to heat transfer. We therefore have a refrigerant of gas or liquid or solid, a radiator medium, gas or liquid, and air circulation. The air may be moved only when the room condition demands; and simultaneously the radiator medium may be moved from a source of constant temperature as the contact with the refrigerant or the radiator medium may be moved whenever necessary to maintain it at a constant temperature in the radiator.

Cold water from a city supply may be employed either as a refrigerant or as a radiator medium. The temperature control may operate a pump for such water or open a valve to allow it to enter the system under pressure.

The cold water supply pipe from a city supply, well, or the like, is marked 23a. The pipe 21 discharges into the drain 21a unless the valve 21b is open and the valve 21c closed, in which event the water can continue to circulate, if desired, through the by-pass 21d as a continuous system in which event the belt 16a can be removed so that it will not drive the pump 16b which may be employed if the water pressure is insufficient in the pipe 23a.

In Figure 6 it will be noted that the thermostat is mounted in one of the radiators, such as 10, so that the temperature of the water, where the air is passing over the radiator, will be a controlling factor in circulating the radiator medium. But, in this arrangement, it may not be desirable to circulate the air simultaneously and, if that is the case, then the blower 7 may be operated by an independent motor, such as 16, from a thermostat 19, in the room to which the air is being delivered.

In Figure 7 is shown a boiler 23b which may be employed as a source of heated radiator medium.

Solid carbon dioxide is used to designate simply an ice. Any refrigerant may be used. By "spray" we mean any form of humidity or water handling means. By "liquid" we refer to any suitable fluid.

During the heating season the thermostat prevents overheating. The heating medium, the radiator or whatever is controlled by the thermostat, must be of sufficient size to bring the space heated up to the condition desired, otherwise the thermostat would not be able to function. When the temperature reaches that desired, due to the fact that sufficient capacity has been installed, then the thermostat regulates that device so that it cannot overheat. In other words the thermostat shuts it off when the temperature gets to the point at which the thermostat is placed or set. It is simply a means to prevent overheating.

In the summer time it can be used as a means to prevent overcooling, and we must assume that the equipment which has been installed is of sufficient capacity to do the cooling required, and when the cooling reaches the point at which the thermostat is set it prevents further cooling. It does not regulate the cooling any more than it regulates the heating, but it prevents it from going beyond the point at which the instrument is set, which is supposed to be the condition which is desired.

Having thus fully described our invention, what we claim as new and desire to secure by Letters Patent, is:

1. In combination, in an air conditioning system, a casing, a blower, a radiator in the casing, a radiator circuit, a pump for circulating a medium through said radiator and radiator circuit, a motor for operating said pump and said blower a thermostat for controlling said motor operation, a constant temperature means applicable to the medium in the radiator circuit, and means to control the constant temperature means.

2. In combination, in an air conditioning system, a casing, a blower, a radiator in the casing, a radiator circuit, a pump for circulating a medium through said radiator and radiator circuit, a motor for operating said pump and said blower simultaneously, a thermostat for controlling said motor operation, a constant temperature means applicable to the medium in the radiator circuit, and thermostatic means in the said means for maintaining a constant temperature therein whereby the constant temperature means is maintained at constant temperature.

3. In an air conditioning apparatus, a blower, a radiator in the path of the air moved by the blower, means of circulating a medium to and from the radiator comprising a pipe system and a pump, a motor for operating said blower and said pump, a container for said medium in the radiator circuit, a heat transfer coil connected to a refrigerant circuit, and means of controlling the temperature of the refrigerant in said circuit.

4. In an air conditioning apparatus, a blower, a radiator in the path of the air moved by the blower, means of circulating a medium to and from the radiator comprising a pipe system and a pump, a motor for operating said blower and said pump, a container for said medium in the radiator circuit, a heat transfer coil connected to a refrigerant circuit, means of controlling the temperature of the refrigerant in said circuit, means to circulate the refrigerant through the heat transfer coil, a motor to operate said circulating means, and a common thermostat for controlling the operation of said motors to control their simultaneous operation.

5. In a method of conditioning air, blowing air into an enclosure over a radiator containing a heat transfer medium, simultaneously circulating a heat transfer medium therethrough and simultaneously circulating through the heat transfer medium another heat transfer medium as in a refrigerant circuit, and controlling said heat transfer mediums in their circulations in their respective circuits by a common thermostat in the room to which air is delivered.

6. In combination, in an air conditioning system, a casing, a blower, a radiator in the casing, a radiator circuit, a pump for circulating a medium through said radiator and radiator circuit, a motor for operating said pump and said blower, a thermostat for controlling said motor operation, and a constant temperature means applicable to the medium in the radiator circuit remote from the radiator, and means to control the medium circulation by the temperature of the air in the system.

7. In combination, in an air conditioning system, a casing, a blower, a radiator in the casing, a radiator circuit, a pump for circulating a medium through said radiator and radiator circuit a motor for operating said pump and said blower a thermostat for controlling said motor operation, and a constant temperature means applicable to the medium in the radiator circuit remote from the radiator, and means to control the medium circulation by the temperature of the air in the system, and means to move the air simultaneously.

8. In combination, in an air conditioning system, a casing, a blower, a radiator in the casing, a radiator circuit, a pump for circulating a medium through said radiator and radiator circuit, a motor for operating said pump and said blower, a thermostat for controlling said motor operation, a constant temperature means applicable to the medium in the radiator circuit remote from the radiator, and thermostatic means in the said means for maintaining a constant temperature therein whereby the constant temperature means is maintained at constant temperature.

CLARK T. MORSE.
EDWARD L. HOGAN.